United States Patent
Ding et al.

(10) Patent No.: US 10,788,589 B1
(45) Date of Patent: Sep. 29, 2020

(54) RAPID DETERMINATION OF AN UNKNOWN POSITION

(71) Applicant: Kolmostar Inc., Fremont, CA (US)

(72) Inventors: Jie Ding, Durham, NC (US);
Wensheng Hua, Fremont, CA (US)

(73) Assignee: Kolmostar Inc., Fremont, CA (US)

( * ) Notice: Subject to any disclaimer, the term of this patent is extended or adjusted under 35 U.S.C. 154(b) by 315 days.

(21) Appl. No.: 15/915,974

(22) Filed: Mar. 8, 2018

(51) Int. Cl.
  *G01S 19/44* (2010.01)
  *G01S 19/29* (2010.01)
  *G01S 19/30* (2010.01)

(52) U.S. Cl.
  CPC .............. *G01S 19/44* (2013.01); *G01S 19/29* (2013.01); *G01S 19/30* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2009/0135056 | A1* | 5/2009 | Dai | G01S 19/32 342/357.31 |
| 2010/0049469 | A1* | 2/2010 | Wirola | G01O 5/06 702/150 |
| 2013/0135145 | A1* | 5/2013 | Iwase | G01S 19/44 342/357.27 |
| 2017/0269216 | A1* | 9/2017 | Dai | G01S 19/32 |
| 2017/0269231 | A1* | 9/2017 | Dai | G01S 19/44 |

OTHER PUBLICATIONS

De Jonge et al., "The LAMBDA method for integer ambiguity estimation: implementation aspects", Aug. 1996.
Misra et al., "Global Positioning System: Signals, Measurements, and Performance", second edition, chapter 7, 2001.
P.J.G. Teunissen, "The LAMBDA Method for the GNSS Compass", Delft University of Technology, 2006.

* cited by examiner

*Primary Examiner* — Mamadou L Diallo
(74) *Attorney, Agent, or Firm* — Van Pelt, Yi & James LLP

(57) ABSTRACT

A system for rapid determination of an unknown position includes an interface and a processor. The interface is configured to receive carrier phase information and code information from a global navigation satellite system signal. The processor is configured to receive double-difference phase information generated using carrier phase information and code information; and calculate an accurate position based at least in part on a most likely integer solution for the carrier phase ambiguity based at least in part on the double-difference phase information.

46 Claims, 6 Drawing Sheets

Algorithm 1 Integer quadratic minimization with bootstrapping

Input: positive definite matrix $V_{xx} \in \mathbb{R}^{d \times d}$, observations $x \in \mathbb{R}^{d \times 1}$, boost size $n$, neighbor radius $r > 0$, order of nearest neighbor $1 \leq k < n$

Output: $\hat{x} \in \mathbb{Z}^{d \times 1}$ that approximates the most likely integer solution Gaussian random samples
1: Generate $x_1, \ldots, x_n$
2: from a Gaussian distribution with mean $x$ and covariance $V_{xx}$.

Create rounded sets.
3: for $i = 1 \to n$ do
4:     Calculate $\bar{x}_i = \text{round}(x_i)$ and $r_i = \|\bar{x}_i - x_i\|_2$
5:     Update the unique integer points from $\bar{x}_1, \ldots, \bar{x}_n$, denoted by $\mathcal{X}$
6:     For each $\bar{x} \in \mathcal{X}$, update the "rounding set" $R(\bar{x})$ that records all $i$'s such that $\bar{x} = \text{round}(x_i)$
7: end for

Qualify sets.
8: For each $\bar{x} \in \mathcal{X}$, count the number of samples within $R(\bar{x})$ that fall into the ball centered at $\bar{x}$ with radius $r$,
9: Obtain $\#(\bar{x}) \triangleq \text{card}\{i : \|x_i - \bar{x}\| \leq r, i \in R(\bar{x})\}$ (where card(·) denotes the cardinality of a finite set)

Choose integer solution.
10: if $\max_{\bar{x} \in \mathcal{X}} \#(\bar{x}) \leq k$ then
11:     Let $x = \arg\max_{\bar{x} \in \mathcal{X}} \#(\bar{x})$ Score sets.
12: else
13:     Let $\mathcal{X}' \triangleq \{\bar{x} \in \mathcal{X} : \#(\bar{x}) > k\}$ denote the integer point that has sufficient numbers of neighboring samples.
14:     Compute the $\ell_2$-distance between $\bar{x}$ and its $k$th nearest neighbor within $\{x_i, i \in R(\bar{x})\}$, denoted by $D_k(\bar{x})$, for each $\bar{x} \in \mathcal{X}'$ (using the recorded $r_1, \ldots, r_n$)

Choose integer solution.
15:     Let $\hat{x} = \arg\min_{\bar{x} \in \mathcal{X}'} D_k(\bar{x})$
16: end if

Fig. 3

Algorithm 2 Integer quadratic minimization with bootstrapping

Input: positive definite matrix $V_{xx} \in \mathbb{R}^{d \times d}$, observations $x \in \mathbb{R}^{d \times 1}$, boost size $n$, neighbor radius $r > 0$, threshold of votes $1 \leq \ell < n$

Output: $\hat{x} \in \mathbb{Z}^{d \times 1}$ that approximates the most likely integer solution Gaussian random samples
1: Generate $x_1, \ldots, x_n$
2: from a Gaussian distribution with mean $x$ and covariance $V_{xx}$.

Create rounded sets.
3: for $i = 1 \to n$ do
4:     Calculate $\bar{x}_i = \text{round}(x_i)$ and $r_i = \|\bar{x}_i - x_i\|_2$
5:     Update the unique integer points from $\bar{x}_1, \ldots, \bar{x}_n$, denoted by $\mathcal{X}$
6:     For each $\bar{x} \in \mathcal{X}$, update the "rounding set" $R(\bar{x})$ that records all $i$'s such that $\bar{x} = \text{round}(x_i)$
7: end for

Qualify sets.
8: For each $\bar{x} \in \mathcal{X}$, count the number of samples within $R(\bar{x})$ that fall into the ball centered at $\bar{x}$ with radius $r$
9: Obtain $\#(\bar{x}) \triangleq \text{card}\{i : \|x_i - \bar{x}\| \leq r, i \in R(\bar{x})\}$ (where card($\cdot$) denotes the cardinality of a finite set)

Score sets.
10: Let $\mathcal{X}' \triangleq \{\bar{x} \in \mathcal{X} : \#(\bar{x}) > \ell\}$
11: denote the integer points with sufficient neighboring samples
12: for each $\bar{x} \in \mathcal{X}'$ do
13:     Calculate $e_{\bar{x}} = (\bar{x} - x)^{\mathrm{T}} V_{xx}^{-1} (\bar{x} - x)$
14: end for

Choose integer solution.
15: Let $x = \arg\min_{\bar{x} \in \mathcal{X}'} e_{\bar{x}}$
16: Output $\hat{x}$ and $e_{\hat{x}}$.

Fig. 4

Algorithm 3 Integer quadratic minimization with bootstrapping

Input: positive definite matrix $V_{xx} \in \mathbb{R}^{d \times d}$, observations $x \in \mathbb{R}^{d \times 1}$, boost size $n$, neighbor radius $r > 0$, number of layers $L$

Output: $\hat{x} \in \mathbb{Z}^{d \times 1}$ that approximates the most likely integer solution Define sampling layers $P_i$
1: Partition sample space into different layers:
2: $P_i = \{y : (x - y)^\mathrm{T} V_{xx}^{-1}(x - y) \geq \tau_i\}$, where $0 \leq \tau_1 < \tau_2 < \cdots$.
3: Initialize optimum value $v_0 = \infty$ Apply algorithm 2 to layer $P_i$.
4: for $i = 1 \to L$ do
5:    Generate $x_1, \ldots, x_n$ from a truncated Gaussian distribution on $P_i$ with mean $x$ and covariance $V_{xx}$ using Algorithm 4.
6:    Apply Algorithm 2 to obtain the optimal integer $\hat{x}_i$ and its associated optimal value $v_i = e_{\hat{x}_i}$.

Choose integer solution.
7:    if $v_i < v_0$ then
8:       Let $v_0 = v_i$, $\hat{x} = \hat{x}_i$.
9:    end if
10: end for

Fig. 5

Algorithm 4 Truncated Gaussian sampling

Input: positive definite matrix $V_{xx} \in \mathbb{R}^{d \times d}$, sample size $n$, mean $y$, layer level $\tau > 0$

Output: A set $S$ containing $n$ samples $x_1, \ldots, x_n$ distributed according to Gaussian distribution $\mathcal{N}(y, V_{xx})$ conditioned on
$P = \{x : (x - y)^{\mathrm{T}} V_{xx}^{-1} (x - y) \geq \tau\}$ 1: Initialize $i = 0$ (sample size), $S = \emptyset$ (sample set).
2: while $i < n$ do
3:

Generate $2n$ samples from a truncated Gaussian $\mathcal{N}(y, V_{xx})$ truncated on $P_i$ such that: 1) at least one dimension is a truncated Gaussian, and the remaining dimension(s) are generated from standard Gaussian, 2) the (scalar) truncated Gaussian is truncated at $a = \sqrt{\tau/d}$, using the inverse transform $$-F^{-1}(F(-a)U)$$

where $U$ is a uniform random variable on $[0, 1]$ and F denotes the cumulative distribution function of standard Gaussian.

4:

Determine samples that fall into P, add them to sample set $S$, and update $i$

5: end while

RAPID DETERMINATION OF AN UNKNOWN POSITION

BACKGROUND OF THE INVENTION

Global navigation satellite systems (GNSS) use both code phase and carrier phase measurements for accurate positioning. Because carrier phase measurements are made at a much higher frequency than code phase measurements, they provide a much more accurate reference for localization. However, because the carrier phase is highly regular, using carrier phase measurements to calculate position suffers from ambiguities in the choice of phase alignment. As a result, one of the central design goals of a reliable GNSS is to effectively and efficiently estimate the unknown cycle ambiguities of double-difference carrier phase data and turn the carrier phase measurements into accurate pseudo-range measurements. Resolving the carrier phase ambiguity makes it possible to achieve centimeter-level positioning. Although centimeter-level relative positioning with carrier phase is now routine in fields such as surveying, geophysics, and geodesy, the challenge of estimating the integer phase ambiguity quickly and correctly for precise positioning in real time is an unsolved problem. Given the increasing demand for precise navigation in applications such as fast-moving vehicles or unmanned aerial vehicles, estimating the integer phase ambiguity quickly and correctly is critical because a real-time position estimate often needs to be made using only a single epoch of data from the global navigation satellite system.

BRIEF DESCRIPTION OF THE DRAWINGS

Various embodiments of the invention are disclosed in the following detailed description and the accompanying drawings.

FIG. 3 is a pseudo code illustrating an embodiment of an algorithm for performing integer quadratic minimization with bootstrapping to determine the integer-constrained ambiguity vector $\hat{x}$.

FIG. 4 is a pseudocode illustrating an embodiment of an algorithm for performing integer quadratic minimization with bootstrapping to determine the integer-constrained ambiguity vector $\hat{x}$.

FIG. 5 is a pseudocode illustrating an embodiment of an algorithm for performing integer quadratic minimization with bootstrapping to determine the integer-constrained ambiguity vector $\hat{x}$.

FIG. 6 is a pseudocode illustrating an embodiment of an algorithm for performing truncated Gaussian sampling.

DETAILED DESCRIPTION

Figure 1:
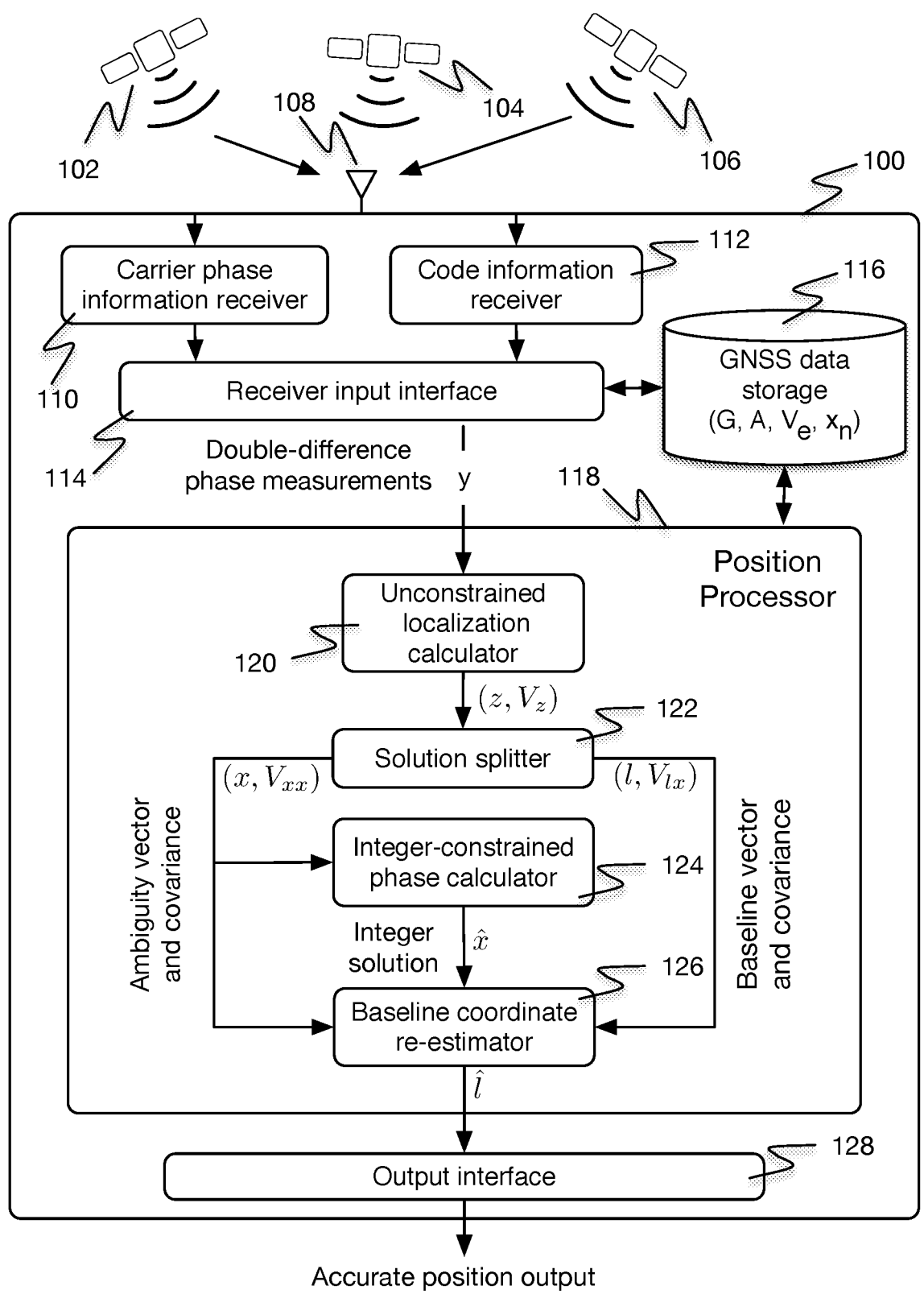
FIG. 1 is a block diagram illustrating an embodiment of a system for rapid determination of an unknown position using Global Navigation Satellite System (GNSS) code phase and carrier phase measurements.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for rapid determination of an unknown position using Global Navigation Satellite System (GNSS) code phase and carrier phase measurements is disclosed. The system includes a receiving system for GNSS carrier phase information and code information. The receiving system includes an interface and a position processor. The interface is configured to receive the carrier phase information and the code information receiver. The interface is configured to receive information from a GNSS memory. Double-difference phase measurement information is determined from the carrier phase information and/or the code information. The input interface is configured to receive GNSS data including the satellite position matrix from the GNSS memory. The position processor is configured to calculate the accurate position based at least in part on the most likely integer solution for the carrier phase ambiguity based at least in part on the double difference phase information and the GNSS data.

A system for rapid determination of an unknown position using Global Navigation Satellite System (GNSS) comprises a number of satellites or other sources that transmit data about the state of the GNSS system via a carrier signal and a receiver system that receives carrier phase information and GNSS code information and sends this information to a position processor which outputs a highly accurate position estimate. The position processor comprises an unconstrained localization calculator, an integer-constrained phase calculator, and a baseline coordinate re-estimator. Within the unconstrained localization calculator, all the unknown parameters for determining the unknown position are estimated without consideration of the special integer phase ambiguity constraints using least squares estimation. The result is passed onto the integer-constrained phase calculator and the baseline coordinate re-estimator. Within the integer-constrained phase calculator, the solution from the unconstrained localization calculator is used to search for the most likely integer solution. The baseline coordinate re-estimator then uses the integer solution determined by the integer-constrained phase calculator to re-estimate the position. An output interface receives baseline coordinate information from the baseline coordinate re-estimator and outputs an accurate position.

In contrast to traditional GNSS systems that use carrier phase to perform centimeter-level relative positioning, the disclosed system for rapid determination of an unknown position improves on the typical GNSS and is able to quickly and correctly calculate precise positioning in real time. For real-time applications, estimating the integer phase ambiguity quickly and correctly is critical because a position estimate often needs to be made using only a single epoch of data from a global navigation satellite system. The disclosed method is also applicable to other systems that require resolving phase difference ambiguities such as the next-generation triple-frequency systems (e.g. European Galileo) as well as solving phase-unwrapping problems encountered in Interferometric Synthetic Aperture Radar.

FIG. 1 is a block diagram illustrating an embodiment of a system for rapid determination of an unknown position using Global Navigation Satellite System (GNSS) code phase and carrier phase measurements. In the example shown, a system for rapid determination of an unknown position 100 receives GNSS code phase and carrier phase measurements from a number of satellites (e.g., satellite 102, satellite 104, or satellite 106) via antenna 108 and processes the measurements to output an accurate position. Carrier phase information receiver 110 receives information about the phase of the GNSS carrier from antenna 108 and sends carrier phase information to receiver input interface 114. Code information receiver 112 receives GNSS code information via antenna 108 and sends GNSS code information to receiver input interface 114. Receiver interface 114 stores GNSS code information including a satellite position matrix G, ionospheric and tropospheric parameter matrix A, and measurement noise covariance $V_e$ in GNSS data storage 116. In some embodiments, random samples $x_n$ are stored in a separate random access memory that is only accessible by position processor 118. Receiver interface 114 processes GNSS code phase and carrier phase measurements and sends double-difference phase measurements to position processor 118. Position processor 118 receives double-difference phase measurements y from receiver interface 114 and GNSS data from GNSS data storage 116 and outputs accurate baseline coordinates to output interface 128. Output interface 128 receives baseline coordinates from position processor 118 and outputs accurate position from system for rapid determination of an unknown position 100.

Unconstrained localization calculator 120 is configured to receive double-difference phase measurements y, satellite position matrix G, ionospheric and tropospheric parameter matrix A, and measurement noise covariance $V_e$ from receiver input interface 114 and GNSS data storage 116. Unconstrained localization calculator 120 is further configured to solve the linear localization equation: $y=\Phi z+e$, where $\Phi=[G|A]$ (concatenation of G and A matrices), $z=[l^T|x^T]$ (concatenation of l and x vectors), and e is Gaussian noise with known covariance matrix $V_e$. Unconstrained localization calculator 120 calculates the maximum likelihood estimate of z that contains the jointly unknown parameters l and x (baseline coordinates and continuous phase ambiguities, respectively) for the localization equation. The maximum likelihood estimator of z is calculated from:

$$\hat{z}=(\Phi^T V_e^{-1}\Phi)^{-1}\Phi^T V_e^{-1} y$$

where the covariance of z is calculated from:

$$V_z=(\Phi^T V_e^{-1}\Phi)^{-1},$$

which can also be written in the form:

$$V_z = \begin{bmatrix} V_{ll} & V_{lx} \\ V_{xl} & V_{xx} \end{bmatrix}.$$

Unconstrained localization calculator 120 sends the resulting vector z and the covariance matrix $V_z$ to the solution splitter 122.

Solution splitter 122 separates the solution z into its components l and x as well as the covariance matrix $V_z$ into its components $V_{xx}$ and $V_{xl}$. Solution splitter 122 sends the components (x, $V_{xx}$) to integer-constrained phase calculator 124 and baseline coordinate re-estimator 126. Solution splitter 122 sends the components (l, $V_{lx}$) to baseline coordinate re-estimator 126.

Integer-constrained phase calculator 124 receives the unconstrained solution components (x, $V_{xx}$) and calculates an integer-constrained solution for x. Integer-constrained phase calculator 124 sends the integer solution to baseline coordinate re-estimator 126.

Baseline coordinate re-estimator 126 receives unconstrained solution components (x, $V_{xx}$) from solution splitter 122, integer $\hat{x}$ solution from integer-constrained phase calculator 124, and unconstrained solution components (l, $V_{lx}$) from solution splitter 122 and re-estimates the baseline coordinates to produce an accurate position output. The baseline coordinate re-estimator sends $\hat{l}$ to output interface 128 where it outputs an accurate position output from the system for rapid determination of an unknown position 100.

Figure 2:
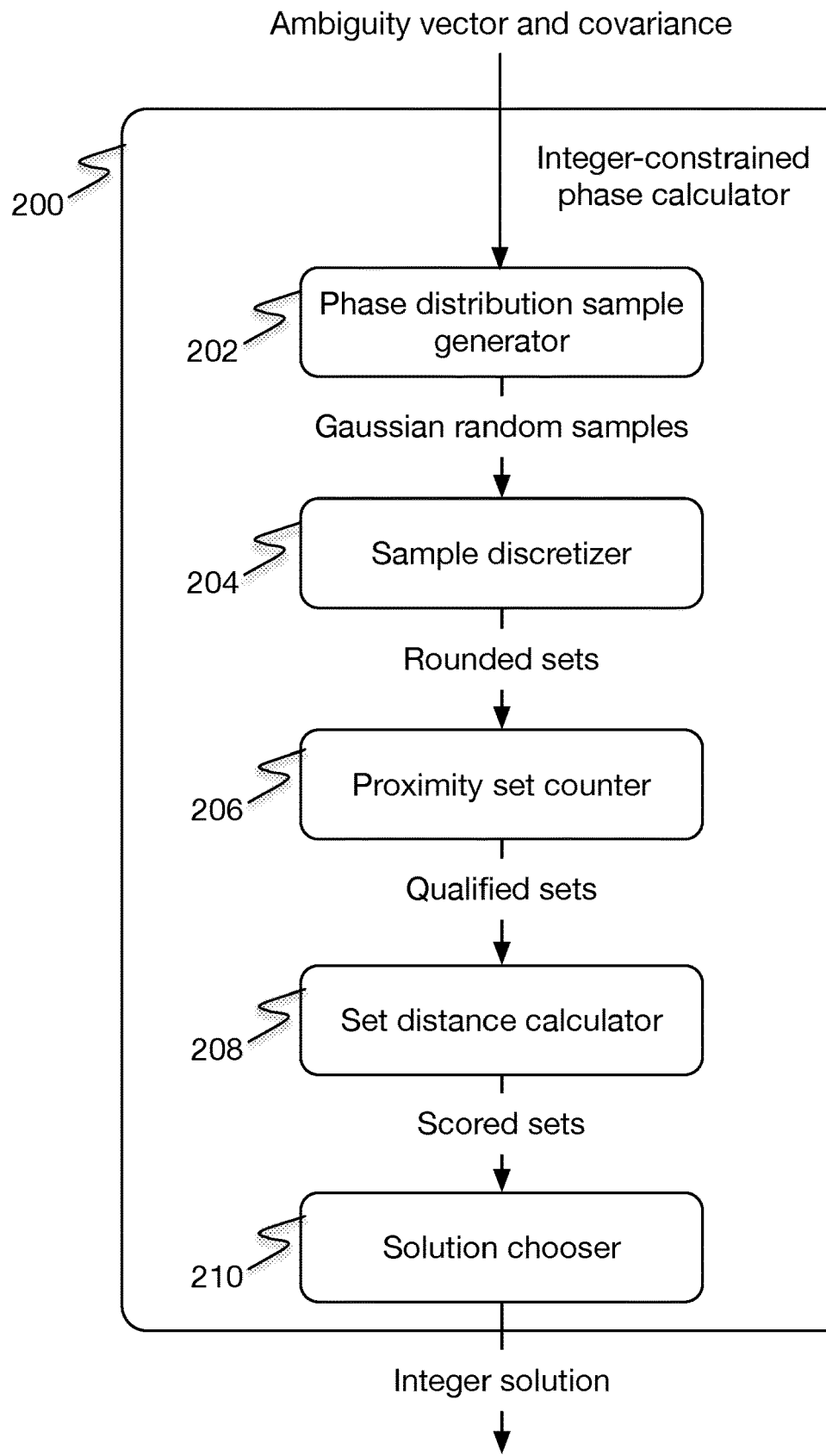
FIG. 2 is a block diagram illustrating an embodiment of an integer-constrained phase calculator for calculating an integer-constrained solution for the ambiguity vector x.

FIG. 2 is a block diagram illustrating an embodiment of an integer-constrained phase calculator for calculating an integer-constrained solution for the ambiguity vector x. In some embodiments, integer-constrained phase calculator 200 is used to implement integer-constrained phase calculator 124 of FIG. 1. In the example shown, integer-constrained phase calculator 200 receives unconstrained ambiguity vector and covariance matrix and calculates an integer-constrained solution of x. For example, integer-constrained phase calculator 200 receives continuous ambiguity vector and covariance (x, $V_{xx}$) from an unconstrained localization calculator. Phase distribution sample generator 202 receives ambiguity vector and covariance (x, $V_{xx}$) and generates random samples with a Gaussian distribution. For example, phase distribution sample generator 202 generates independent and identically distributed random samples drawn from a Gaussian probability distribution with mean x and covariance $V_{xx}$. Gaussian random samples are received by sample discretizer 204, which rounds the samples to the closest integer value. For example, sample discretizer 204 computes round($x_i$) for all Gaussian samples $x_i$ and computes the set of all unique integer values. For each unique value, sample discretizer 204 records all samples that are discretized to the same integer value. Proximity set counter 206 receives rounded set from sample discretizer 204 and counts the number of set samples that fall within a radius r of each unique integer member of the set. Qualified sets are recorded for sets with a sufficient number of neighboring samples. Set distance calculator 208 receives qualified sets from proximity set counter 206 and scores each member of the set using the Euclidian distance between the set member and its k'th nearest neighbors. Solution chooser 210 receives the scored sets from set distance calculator 208 and chooses the best integer solution. For example, solution chooser 210 chooses the solution with the minimum Euclidian distance of its k'th nearest neighbor. Integer-constrained phase calculator 200 outputs optimal integer solution. For example, integer-constrained phase calculator 200 outputs integer solution to baseline coordinate re-estimator 126 of FIG. 1.

FIG. 3 is a pseudo code illustrating an embodiment of an algorithm for performing integer quadratic minimization with bootstrapping to determine the integer-constrained ambiguity vector $\hat{x}$. In some embodiments, Algorithm 1 of FIG. 3 is used to implement integer-constrained phase calculator 124 of FIG. 1. In the example shown, the input to Algorithm 1 comprises an unconstrained ambiguity vector x, covariance matrix $V_{xx}$, boost size n, neighbor radius r, and number of nearest neighbors k. The output of Algorithm 1 is the most likely integer solution. For example, integer-constrained phase calculator 124 of FIG. 1 receives ambiguity vector and covariance (x, $V_{xx}$) from an unconstrained localization calculator and uses Algorithm 1 to determine the most likely integer solution. Steps 1-2 of Algorithm 1 generate independent and identically distributed random samples drawn from a Gaussian probability distribution with mean x and covariance $V_{xx}$. The random samples $x_i, \ldots, x_n$ are generated using phase distribution sample generator 202 of FIG. 2. Random samples $x_n$ are stored in a random access memory 116 of FIG. 1 accessible by position processor 118. In some embodiments, random samples $x_n$ are stored in a separate random access memory that is only accessible by position processor 118. Steps 3-7 of Algorithm 1 create rounded sets by rounding the samples generated in steps 1-2 of Algorithm 1 to the nearest integer value. In some embodiments, sample discretizer 204 of FIG. 2 rounds samples. Steps 8-9 of Algorithm 1 determine which of the unique integer points qualify as a possible solution by counting the number of samples that fall within a radius r of a unique integer point. In some embodiments, proximity set counter 206 of FIG. 2 counts samples within a radius r of unique integer points. Steps 10-11 of Algorithm 1 test if an integer solution can be determined by the number of samples within a given radius r without further analysis. Steps 12-14 of Algorithm 1 score the qualified sets from steps 8-9 to determine the best integer solution. In some embodiments, set distance calculator 208 of FIG. 2 scores qualified sets. Steps 15-16 of Algorithm 1 choose the best integer solution. In some embodiments, solution chooser 210 of FIG. 2 chooses best integer solution.

FIG. 4 is a pseudocode illustrating an embodiment of an algorithm for performing integer quadratic minimization with bootstrapping to determine the integer-constrained ambiguity vector $\hat{x}$. In some embodiments, Algorithm 2 of FIG. 4 is used to implement integer-constrained phase calculator 124 of FIG. 1. Algorithm 2 differs from Algorithm1 in that a set of pre-screened candidate integers is identified instead of only one value. In addition, instead of using the k-nearest neighbor strategy of Algorithm1, the weighted mean-squared error is computed for each candidate ambiguity vector x and the one with the lowest error is chosen. Algorithm 2 serves to enhance the performance for high dimensional ambiguity vector x and covariance $V_{xx}$ at the cost of more computation. In the example shown, the input to Algorithm 2 comprises an unconstrained ambiguity vector x, covariance matrix $V_{xx}$, boost size n, neighbor radius r, and threshold of votes L. The output of Algorithm 2 is the most likely integer solution. For example, integer-constrained phase calculator receives ambiguity vector and covariance (x, $V_{xx}$) from an unconstrained localization calculator and uses Algorithm 2 to determine the most likely integer solution. Steps 1-2 of Algorithm 2 generate independent and identically distributed random samples drawn from a Gaussian probability distribution with mean x and covariance $V_{xx}$. The random samples $x_i, \ldots, x_n$ are generated using a phase distribution sample generator of an integer-constrained phase calculator. Random samples $x_1, \ldots, x_n$ are stored in a random access memory accessible by a position processor. In some embodiments, random samples $x_i, \ldots, x_n$ are stored in a separate random access memory that is only accessible by the position processor. Steps 3-7 of Algorithm 2 create rounded sets (R(x)) in the random access memory by rounding the samples generated in steps 1-2 of Algorithm 2 to the nearest integer value. The sample discretizer rounds samples. Steps 8-9 of Algorithm 2 determine which of the unique integer points qualify as a possible solution by counting the number of samples that fall within a radius r of a unique integer point. A proximity set counter counts samples within a radius r of unique integer points and stores the count in the random access memory. Steps 10-14 of Algorithm 2 create a set of integer points with sufficient neighboring samples by tabulating the number of votes for the solution passing a threshold. This set is then used to score the qualified sets from steps 8-9 to determine the best integer solution using the mean-squared error ex in step 13. Set distance calculator scores qualified sets. Steps 15-16 of Algorithm 2 choose the best integer solution and output the integer-constrained ambiguity vector x along with its mean-squared error ex. Solution chooser chooses best integer solution.

FIG. 5 is a pseudocode illustrating an embodiment of an algorithm for performing integer quadratic minimization with bootstrapping to determine the integer-constrained ambiguity vector $\hat{x}$. In some embodiments, Algorithm 3 of FIG. 5 is used to implement integer-constrained phase calculator 124 of FIG. 1. In the example shown, input to Algorithm 3 comprises an unconstrained ambiguity vector x, covariance matrix $V_{xx}$, boost size n, neighbor radius r, and number of layers L. The output of Algorithm 3 is the most likely integer solution. For example, integer-constrained phase calculator receives ambiguity vector and covariance (x, $V_{xx}$) from an unconstrained localization calculator and uses Algorithm 3 to determine the most likely integer solution. Algorithm 3 is used to enhance the performance for high dimension and ill-conditioned covariance matrix $V_{xx}$. It is an extension of Algorithm 2 and is especially suitable for situations where generating random numbers is costly and where fast computation is the main concern. Algorithm 3 replaces the scheme of generating Gaussian random variables with a more complex multi-layer scheme, which successively generates truncated Gaussian random variables for each layer using Algorithm 4 of FIG. 6. By performing the solution search for each layer, Algorithm 3 more efficiently explores the space of potential solutions in order to quickly find the global optimum. Steps 1-3 of Algorithm 3 define partitions P1 for each sampling layer and initialize the local variable $v_0$ for tracking the current mean-squared error ex of the solution x. Partitions $P_i$ are truncated Gaussian probability functions parameterized by truncation thresholds Ti where $0 <= \tau_1 <= \tau_2 < \ldots$. Steps 4-6 of Algorithm 3 apply Algorithm 2 to each layer $P_i$. Truncated Gaussian distributions are generated by Algorithm 4 and used as input to Algorithm 2. Algorithm 2 calculates the optimal integer solution and returns the optimal integer solution together with its associated mean-squared error. The mean squared error is stored in the variable $v_i$. Steps 7-9 choose the integer solution. If the current mean-squared error $v_i$ for layer i is less than prior solutions $v_0$, then the current integer solution is chosen as the best solution.

FIG. 6 is a pseudocode illustrating an embodiment of an algorithm for performing truncated Gaussian sampling. In some embodiments, Algorithm 4 of FIG. 6 is used to implement phase distribution sample generator of FIG. 2. In the example shown, input to Algorithm 4 comprises a mean vector y, covariance matrix $V_{xx}$, sample size n, layer level T, and number of layers L. The output of Algorithm 4 is a set S containing n samples $x_1, \ldots, x_n$ distributed according to a truncated Gaussian distribution with threshold T. Step 1 of Algorithm 4 initializes the sample set S. Steps 2-5 generate samples from a truncated Gaussian by transforming a uniform distribution into a truncated Gaussian distribution and adding them to set S.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for rapid determination of an unknown position comprising:
   an interface configured to:
      receive carrier phase information and code information from a global navigation satellite system signal;
   a processor configured to:
      receive double-difference phase information generated using carrier phase information and code information; and
      calculate an accurate position based at least in part on a most likely integer solution for the carrier phase ambiguity based at least in part on the double-difference phase information, wherein calculating the accurate position includes calculating a maximum likelihood estimate of baseline coordinates and continuous phase ambiguities.

2. The system as in claim 1, wherein calculating the accurate position includes separating the baseline coordinates and the continuous phase ambiguities.

3. The system as in claim 1, wherein calculating the accurate position includes calculating a covariance matrix.

4. The system as in claim 3, wherein calculating the accurate position includes separating the covariance matrix.

5. The system as in claim 1, wherein calculating the accurate position includes calculating an integer constrained solution.

6. The system as in claim 5, wherein calculating the accurate position includes re-estimating coordinates based at least in part on the integer constrained solution.

7. The system as in claim 5, wherein calculating the accurate position includes generating random samples with a Gaussian distribution.

8. The system as in claim 7, wherein calculating the accurate position includes rounding the random samples to a closest integer value.

9. The system as in claim 8, wherein calculating the accurate position includes counting a number of the random samples within a radius.

10. The system as in claim 9, wherein calculating the accurate position includes determining a qualified set by determining whether a set has sufficient neighboring samples.

11. The system as in claim 10, wherein calculating the accurate position includes determining a score for the qualified set.

12. The system as in claim 11, wherein determining the score uses a Euclidian distance between the qualified set and its k'th nearest neighbors.

13. The system as in claim 12, wherein calculating the accurate position includes selecting a minimum of the Euclidian distance between the qualified set and its k'th nearest neighbors.

14. The system as in claim 13, wherein the minimum of the Euclidian distance is used to select an integer solution to baseline coordinate re-estimator.

15. A method for rapid determination of an unknown position comprising:
   receiving carrier phase information and code information from a global navigation satellite system signal;
   receiving double-difference phase information generated using carrier phase information and code information; and
   calculating, using a processor, an accurate position based at least in part on a most likely integer solution for the carrier phase ambiguity based at least in part on the double-difference phase information, wherein calculating the accurate position includes calculating a maximum likelihood estimate of baseline coordinates and continuous phase ambiguities.

16. A computer program product for rapid determination of an unknown position, the computer program product being embodied in a non-transitory computer readable storage medium and comprising computer instructions for:
   receiving carrier phase information and code information from a global navigation satellite system signal;
   receiving double-difference phase information generated using carrier phase information and code information; an
   calculating, using a processor, an accurate position based at least in part on a most likely integer solution for the carrier phase ambiguity based at least in part on the double-difference phase information, wherein calculating the accurate position includes calculating a maximum likelihood estimate of baseline coordinates and continuous phase ambiguities.

17. A system for rapid determination of an unknown position comprising:
   an interface configured to:
      receive carrier phase information and code information from a global navigation satellite system signal;
   a processor configured to:
      receive double-difference phase information generated using carrier phase information and code information; and
      calculate an accurate position based at least in part on a most likely integer solution for the carrier phase ambiguity based at least in part on the double-difference phase information, wherein calculating the accurate position includes calculating a covariance matrix, wherein calculating the accurate position includes separating the covariance matrix.

18. The system as in claim 17, wherein calculating the accurate position includes calculating a maximum likelihood estimate of baseline coordinates and continuous phase ambiguities.

19. The system as in claim 18, wherein calculating the accurate position includes separating the baseline coordinates and the continuous phase ambiguities.

20. The system as in claim 17, wherein calculating the accurate position includes calculating an integer constrained solution.

21. The system as in claim 20, wherein calculating the accurate position includes re-estimating coordinates based at least in part on the integer constrained solution.

22. The system as in claim 20, wherein calculating the accurate position includes generating random samples with a Gaussian distribution.

23. The system as in claim 22, wherein calculating the accurate position includes rounding the random samples to a closest integer value.

24. The system as in claim 23, wherein calculating the accurate position includes counting a number of the random samples within a radius.

25. The system as in claim 24, wherein calculating the accurate position includes determining a qualified set by determining whether a set has sufficient neighboring samples.

26. The system as in claim 25, wherein calculating the accurate position includes determining a score for the qualified set.

27. The system as in claim 26, wherein determining the score uses a Euclidian distance between the qualified set and its k'th nearest neighbors.

28. The system as in claim 27, wherein calculating the accurate position includes selecting a minimum of the Euclidian distance between the qualified set and its k'th nearest neighbors.

29. The system as in claim 28, wherein the minimum of the Euclidian distance is used to select an integer solution to baseline coordinate re-estimator.

30. A method for rapid determination of an unknown position comprising:
   receiving carrier phase information and code information from a global navigation satellite system signal;
   receiving double-difference phase information generated using carrier phase information and code information; and
   calculating, using a processor, an accurate position based at least in part on a most likely integer solution for the carrier phase ambiguity based at least in part on the double-difference phase information, wherein calculating the accurate position includes calculating a covariance matrix, wherein calculating the accurate position includes separating the covariance matrix.

31. A computer program product for rapid determination of an unknown position, the computer program product being embodied in a non-transitory computer readable storage medium and comprising computer instructions for:
   receiving carrier phase information and code information from a global navigation satellite system signal;
   receiving double-difference phase information generated using carrier phase information and code information; and
   calculating, using a processor, an accurate position based at least in part on a most likely integer solution for the carrier phase ambiguity based at least in part on the double-difference phase information, wherein calculating the accurate position includes calculating a covariance matrix, wherein calculating the accurate position includes separating the covariance matrix.

32. A system for rapid determination of an unknown position comprising:
   an interface configured to:
     receive carrier phase information and code information from a global navigation satellite system signal;
   a processor configured to:
     receive double-difference phase information generated using carrier phase information and code information; and
     calculate an accurate position based at least in part on a most likely integer solution for the carrier phase ambiguity based at least in part on the double-difference phase information, wherein calculating the accurate position includes calculating an integer constrained solution, wherein calculating the accurate position includes re-estimating coordinates based at least in part on the integer constrained solution.

33. The system as in claim 32, wherein calculating the accurate position includes calculating a maximum likelihood estimate of baseline coordinates and continuous phase ambiguities.

34. The system as in claim 33, wherein calculating the accurate position includes separating the baseline coordinates and the continuous phase ambiguities.

35. The system as in claim 32, wherein calculating the accurate position includes calculating a covariance matrix.

36. The system as in claim 35, wherein calculating the accurate position includes separating the covariance matrix.

37. The system as in claim 32, wherein calculating the accurate position includes generating random samples with a Gaussian distribution.

38. The system as in claim 37, wherein calculating the accurate position includes rounding the random samples to a closest integer value.

39. The system as in claim 38, wherein calculating the accurate position includes counting a number of the random samples within a radius.

40. The system as in claim 39, wherein calculating the accurate position includes determining a qualified set by determining whether a set has sufficient neighboring samples.

41. The system as in claim 40, wherein calculating the accurate position includes determining a score for the qualified set.

42. The system as in claim 41, wherein determining the score uses a Euclidian distance between the qualified set and its k'th nearest neighbors.

43. The system as in claim 42, wherein calculating the accurate position includes selecting a minimum of the Euclidian distance between the qualified set and its k'th nearest neighbors.

44. The system as in claim 43, wherein the minimum of the Euclidian distance is used to select an integer solution to baseline coordinate re-estimator.

45. A method for rapid determination of an unknown position comprising:
   receiving carrier phase information and code information from a global navigation satellite system signal;
   receiving double-difference phase information generated using carrier phase information and code information; and
   calculating, using a processor, an accurate position based at least in part on a most likely integer solution for the carrier phase ambiguity based at least in part on the double-difference phase information, wherein calculating the accurate position includes calculating an integer constrained solution, wherein calculating the accurate position includes re-estimating coordinates based at least in part on the integer constrained solution.

46. A computer program product for rapid determination of an unknown position, the computer program product being embodied in a non-transitory computer readable storage medium and comprising computer instructions for:
   receiving carrier phase information and code information from a global navigation satellite system signal;

receiving double-difference phase information generated using carrier phase information and code information; and calculating, using a processor, an accurate position based at least in part on a most likely integer solution for the carrier phase ambiguity based at least in part on the double-difference phase information, wherein calculating the accurate position includes calculating an integer constrained solution, wherein calculating the accurate position includes re-estimating coordinates based at least in part on the integer constrained solution.

\* \* \* \* \*

UNITED STATES PATENT AND TRADEMARK OFFICE
CERTIFICATE OF CORRECTION

PATENT NO. : 10,788,589 B1
APPLICATION NO. : 15/915974
DATED : September 29, 2020
INVENTOR(S) : Jie Ding and Wensheng Hua Page 1 of 1

It is certified that error appears in the above-identified patent and that said Letters Patent is hereby corrected as shown below:

On the Title Page

Column 1, item (56), U.S. Patent Documents, cite no. 2, delete "G010 5/06" and insert
--G01C 5/06--, therefor.

In the Specification

In Column 5, Line(s) 20, delete "$X_i, \ldots, X_n$" and insert --$X_1, \ldots, X_n$--, therefor.

In Column 6, Line(s) 1, delete "$X_i, \ldots, X_n$" and insert --$X_1, \ldots, X_n$--, therefor.

In Column 6, Line(s) 6, delete "$X_i, \ldots, X_n$" and insert --$X_1, \ldots, X_n$--, therefor.

In Column 6, Line(s) 21, delete "ex" and insert --$e_x$--, therefor.

In Column 6, Line(s) 24, delete "X" and insert -- $\bar{x}$ --, therefor.

In Column 6, Line(s) 25, delete "ex" and insert --$e_x$--, therefor.

In Column 6, Line(s) 52, delete "P1" and insert --$P_i$--, therefor.

In Column 6, Line(s) 54, delete "ex" and insert --$e_x$--, therefor.

In Column 7, Line(s) 4, delete "T" and insert --$\tau$--, therefor.

In Column 7, Line(s) 6, delete "$X_i, \ldots, X_n$" and insert --$X_1, \ldots, X_n$--, therefor.

In Column 7, Line(s) 7, delete "T" and insert --$\tau$--, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*